United States Patent [19]

Bingham et al.

[11] Patent Number: 5,049,444

[45] Date of Patent: Sep. 17, 1991

[54] SILANE ADHESIVE SYSTEM FOR FUSING MEMBER

[75] Inventors: George J. Bingham; Patrick J. Finn, both of Webster; George J. Heeks, Rochester; Arnold W. Henry; Donald A. Seanor, both of Pittsford, all of N.Y.

[73] Assignee: Xerox Corporation, Stamford, Conn.

[21] Appl. No.: 451,056

[22] Filed: Dec. 15, 1989

[51] Int. Cl.$^5$ .............................................. B32B 27/08

[52] U.S. Cl. .................................... 428/339; 428/447; 428/448; 428/449; 428/450

[58] Field of Search ...................... 428/447, 450, 36.8, 428/448, 339, 449; 29/132; 118/60; 430/98, 99; 355/284

[56] References Cited

U.S. PATENT DOCUMENTS

| | | | |
|---|---|---|---|
| 4,029,827 | 6/1977 | Imperial et al. | 427/22 |
| 4,101,686 | 7/1978 | Strella et al. | 427/22 |
| 4,185,140 | 1/1980 | Strella et al. | 428/418 |
| 4,257,699 | 3/1981 | Lentz | 355/3 FU |
| 4,264,181 | 4/1981 | Lentz et al. | 355/3 FU |
| 4,272,179 | 6/1981 | Seanor | 355/3 FU |
| 4,323,603 | 4/1982 | Close | 524/545 |

OTHER PUBLICATIONS

Dupont Viton Fluoroelastomers, "Adhering Viton to Metal During Vulcanization", by E. T. Hackett, Jr., beginning at p. 5.

*Primary Examiner*—Merrell C. Cashion, Jr.

[57] ABSTRACT

A multilayered member for fusing thermoplastic resin toner images to a substrate in a fuser system of the type wherein a polymeric release agent having functional groups is applied to the surface of the fuser member. The multilayered fuser member has in sequential order a base support member, an adhesive layer comprising a copolymer of vinylidene fluoride and hexafluoropropylene and at least 20% by weight of the adhesive layer of a coupling agent comprising at least one organo functional silaneand an activator, a tie coat layer of active ingredients comprising a copolymer of vinylidene fluoride and hexafluoropropylene and an outer elastomeric fusing surface comprising a copolymer of vinylidene fluoride and hexafluoropropylene and containing a metal oxide present in an amount sufficient to interact with a polymeric release agent having functional groups to provide an interfacial barrier layer between said fusing surface and toner.

9 Claims, 1 Drawing Sheet

SILANE ADHESIVE SYSTEM FOR FUSING MEMBER

BACKGROUND OF THE INVENTION

The present invention relates to a fuser member and method for fusing toner images in electrostatographic reproducing apparatus. In particular, it is directed to an adhesive system for bonding the fusing surface or release layer to the base support member.

In a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. The visible toner image is then in a loose powdered form and can be easily disturbed or destroyed. The toner image is usually fixed or fused upon a support which may be the photosensitive member itself or other support sheet such as plain paper.

The use of thermal energy for fixing toner images onto a support member is well know. In order to fuse electroscopic toner material onto a support surface permanently by heat, it is necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner material to be firmly bonded to the support Typically, the thermoplastic resin particles are fused to the substrate by heating to a temperature of between about 90° C. to about 160° C. or higher depending upon the softening range of the particular resin used in the toner. It is undesirable, however, to raise the temperature of the substrate substantially higher than about 200° C. because of the tendency of the substrate to discolor at such an elevated temperatures particularly when the substrate is paper.

Several approaches to thermal fusing of electroscopic toner images have been described in the prior art. These methods include providing the application of heat and pressure substantially concurrently by various means: a roll pair maintained in pressure contact; a belt member in pressure contact with a roll and the like. Heat may be applied by heating one or both of the rolls, plate members or belt members. The fusing of the toner particles takes place when the proper combination of heat, pressure and contact time are provided. The balancing of these parameters to bring about the fusing of the toner particles is well known in the art, and they can be adjusted to suit particular machines or process conditions.

During operation of a fusing system in which heat is applied to cause thermal fusing of the toner particles onto a support, both the toner image and the support are passed through a nip formed between the roll pair, or plate or belt members. The concurrent transfer of heat and the application of pressure in the nip effects the fusing of the toner image onto the support. It is important in the fusing process that no offset of the toner particles from the support to the fuser member takes place during normal operations. Toner particles offset onto the fuser member may subsequently transfer to other parts of the machine or onto the support in subsequent copying cycles, thus increasing the background or interfering with the material being copied there. The so called "hot offset" occurs when the temperature of the toner is raised to a point where the toner particles liquefy and a splitting of the molten toner takes place during the fusing operation with a portion remaining on the fuser member. The hot offset temperature or degradation of the hot offset temperature is a measure of the release property of the fuser roll, and accordingly it is desired to provide a fusing surface which has a low surface energy to provide the necessary release. To insure and maintain good release properties of the fuser roll, it has become customary to apply release agents to the fuser members to insure that the toner is completely released from the fuser roll during the fusing operation. Typically, these materials are applied as thin films of, for example, silicone oils to prevent toner offset.

Some recent developments in fuser members, release agents and fusing systems are described in U.S. Pat. No. 4,264,181 to Lentz et al., U.S. Pat. No. 4,257,699 to Lentz and U.S. Pat. No. 4,272,179 to Seanor, all commonly assigned to the assignee of the present application. These patents describe fuser members and methods of fusing thermoplastic resin toner images to a substrate wherein a polymeric release agent having functional groups is applied to the surface of the fuser member. The fuser member comprises a base member having an elastomeric surface with a metal containing filler therein which has been cured with a nucleophilic addition curing agent. Exemplary of such fuser member is an aluminum base member with a poly(vinylidenefluoride-hexafluoropropylene) copolymer cured with a bisphenol curing agent and having lead oxide filler dispersed therein and utilizing functional polyorganosiloxane oil as a release agent. In those fusing processes, the polymeric release agents have functional groups (also designated as chemically reactive functional groups) which interact with the metal containing filler dispersed in the elastomer or resinous material of the fuser member surface to form a thermally stable film which releases thermoplastic resin toner and which prevents the thermoplastic resin toner from contacting the elastomer material itself. The metal oxide, metal salt, metal alloy or other suitable metal compound filler dispersed in the elastomer or resin upon the fuser member surface interacts with the functional groups of the polymeric release agent. Preferably, the metal containing filler materials do not cause degradation of or have any adverse effect upon the polymeric release agent having functional groups. Because of this reaction between the elastomer having a metal containing filler and the polymeric release agent having functional groups, excellent release and the production of high quality copies are obtained even at high rates of speed of electrostatographic reproducing machines.

While the mechanism involved is not completely understood, it has been observed that when certain polymeric fluids having functional groups are applied to the surface of a fusing member having an elastomer surface with a metal oxide, metal salt, metal, metal alloy or other suitable metal compounds dispersed therein there is an interaction (a chemical reaction, coordination complex, hydrogen bonding or other mechanism) between the metal of the filler in the elastomer and the polymeric fluid having functional groups so that the polymeric release agent having functional groups in the form of a liquid or fluid provides an excellent surface for release having an excellent propensity to remain upon the surface of the fuser member. Regardless of the mechanism, there appears to be the formation of a film upon the elastomer surface which differs from the composition of the elastomer and the composition of the polymeric release agent having functional groups. This film, however, has a greater affinity for the elastomer containing a metal compound than the toner and thereby provides an excellent release coating upon the elastomer surface. The release coating has a cohesive force which is less than the adhesive forces between heated toner and the substrate to which it is applied and the cohesive forces of the toner. The interaction between the functional group of the polymeric release agent and the metal of the elastomer containing metal leads to an overall diminution of the critical or high surface energy of the metal in the metal containing filler.

The use of polymeric release agents having functional groups which interact with a fuser member to form a thermally stable, renewable self-cleaning layer having superior release properties for electroscopic thermal plastic resin toners is described in U.S. Pat. Nos. 4,029,827 to Imperial et al., 4,101,686 to Strella et al. and 4,185,140 also to Strella et al. all commonly assigned to the assignee of the present invention. In particular, U.S. Pat. No. 4,029,827 is directed to the use of polyorganosiloxanes having mercapto functionality as release agents. U.S. Pat. Nos. 4,101,686 and 4,185,140 are directed to polymeric release agents having functional groups such as carboxy, hydroxy, epoxy, amino, isocyanate, thioether, and mercapto groups as release fluids. Some of these fusing systems have enjoyed significant commercial application. For example, a fuser roll made from Viton E 45 (a copolymer of 77 mole percent vinylidenefluoride and 23 mole percent hexafluoropropylene) filled with lead oxide has been successfully used in a fusing system employing a mercapto functional polyorganosiloxane release agent.

While these materials have been used successfully in several commercial applications, they nevertheless exhibit difficulties in certain applications or under certain conditions. In applications where the temperature of the fuser roll reaches 240° C., difficulties are experieced with the fusing layer or release layer adhering to a steel substrate. Typically, an epoxy adhesive such as Thixon 300/301 is used between the steel substrate and the polyvinylidene fluoride hexafluoropropylene fusing surface layer which experiences adhesion failure at elevated temperature. This adhesion failure is experienced by delamination of the copolymer layer from the steel substrate within 500 hours of use leading to premature failure and replacement. Many factors effect this debonding of the copolymer fusing surface at such temperatures including the fact that the epoxy adhesive looses it binding efficiency to the metal or becomes weak and splits. In addition, at the higher temperatures, the steel has a tendency to corrode which also inhibits good bonding. Further, in certain applications, high levels of strain energy in the fusing nip between the fuser roll and the pressure roll can contribute to adhesion failure.

PRIOR ART

In the above referenced, Lentz et al., Lentz and Seanor patents in addition to the disclosure of an epoxy resin for bonding fluoroelastomers to the metal substrate mention is made of the use of dissolved silane polymers as primers for fluoroelastomers. See for example, col. 20, beginning at line 31 of the Lentz U.S. Pat. No. 4,257,699.

U.S. Pat. No. 4,323,603 to Close describes fluoroelastomer film composition with 0.1 to 10 parts silane per 100 parts fluoroelastomer as a curative compound. These compositions do not contain a metal oxide and the silane may either be added directly to the fluoroelastomer and then coated or may be applied to the substrate first with the fluorelastomer applied thereover and the solvent evaported.

Dupont, "Viton Fluoroelastomer", Adhering Viton To Metal During Vulcanization by E. T. Hackett, Jr., beginning at page 5, discusses the use of organosilane compositions as primers for bonding Viton to metal and in Table 3, describes a tie coat of 95 parts of a solution of compound of Viton with 5 parts of an organosilane.

SUMMARY OF THE INVENTION

Accordingly, it is a principle aspect of the present invention to provide a fuser member with improved adhesion between the fusing surface and the base support member when used in a fusing environment at elevated temperatures.

In accordance with a specific aspect of the present invention, we have provided a multilayer fuser member comprising in sequential order a base support member and an adhesive layer comprising a copolymer of vinylidene fluoride and hexafluoropropylene and at least 20 percent by weight of the adhesive layer of a coupling agent comprising at least one organo functional silane and an activator, a tie coat layer comprising a copolymer of vinylidene fluoride and hexafluoropropylene and an outer elastomer fusing surface comprising a copolymer of vinylidene fluoride and hexafluoropropylene and containing a metal oxide present in an amount sufficient to interact with a polymeric release agent having functional groups to provide an interfacial barrier layer between the fusing surface and the toner.

In a further aspect of the present invention, the base support member has an aluminum surface which may be a flame sprayed layer on a cylindrical steel roll support member.

In a further aspect of the present invention, that at least one organo functional silane is a mixture of a triethoxy amino silane and a triethoxy vinyl silane and more specifically comprises about four parts by weight of ethenyltriethoxy silane to one part by weight of 3-(triethoxysilyl)-1 propanamine.

In a further aspect of the present invention, the activator is benzyl triphenyl phosponium chloride.

In a further aspect of the present invention, the copolymer in each of the adhesive, tie coat and fusing layers is about 77 mole percent vinylidene fluoride and about 23 mole percent hexafluoropropylene.

In a further aspect of the present invention, the metal oxide is cupric oxide present in an amount from about 5 to about 30% by weight of the fusing surface.

In a further aspect of the present invention, the adhesive layer is from about 0.2 to about 0.8 mils thick and the tie coat is from about 0.4 to about 0.8 mils thick and the fusing surface or release layer is from about 4.0 mils to about 11.0 mils thick.

Other features of the present invention will become apparent as the following description proceeds and upon reference to the drawings.

DETAILED DESCRIPTION OF THE PRESENT INVENTION

Figure 1:
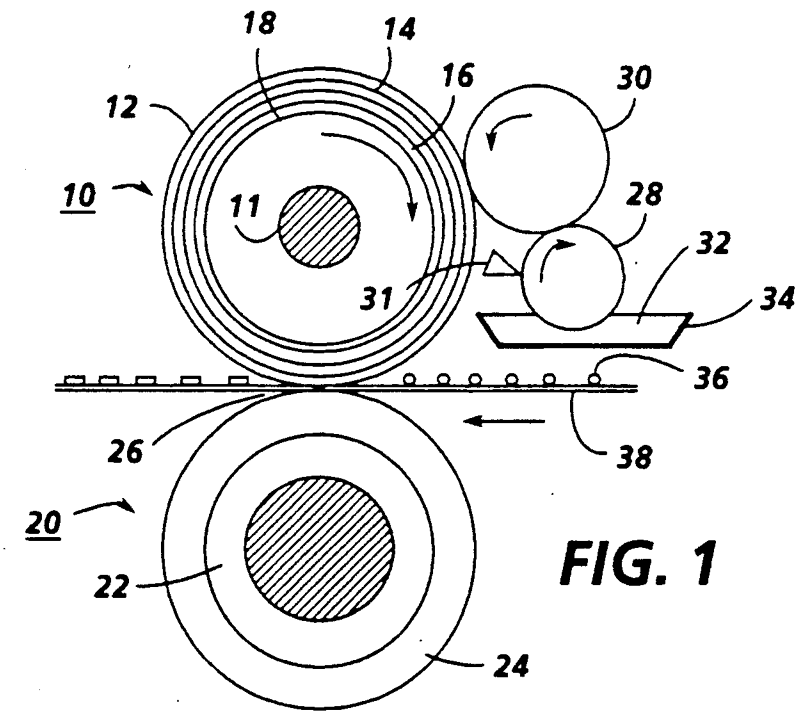
FIG. 1 is a sectional view of a fuser system which may use the fuser member of the present invention.

A typical fuser member of the present invention is described in conjunction with the fuser assembly as illustrated in FIG. 1 wherein the numeral 10 designates a multilayered fuser roll comprising in sequential order a base support member 18, an adhesive layer 16, a tie coat layer 14 and elastomeric fusing surface 12 having metal oxide filler dispersed therein (not shown). The base support member 18 which is typically a hollow cylinder or core has suitable heating element 11 disposed in the hollow portion thereof which is co-extensive with the cylinder. Backup or pressure roll 20 cooperates with the fuser roll 10 to form a fusing nip or contact arc 26 through which a copy paper or other substrate 38 passes such that toner images 36 thereon contact the elastomer fusing surface 12 of the fuser roll 10. As shown in FIG. 1, the backup roll 20 has a rigid steel core 22 with an elastomeric surface or layer 24 thereon. Sump 34 contains polymeric release agent 32 having functional groups thereon which may be solid at room temperature but is fluid at operating temperatures. The release agent is one having functional groups to provide an interfacial barrier layer between the fusing surface and the toner. In the embodiment shown in FIG. 1, two release agent delivery rolls 28 and 30 are provided for applying polymeric release agent 32 to the elastomer surface 12 from the sump 34. These two release agent delivery rolls are rotatably mounted in the direction indicated to transport the release agent from the sump to the elastomeric fusing surface. As illustrated in FIG. 1, roll 28 is partly immersed in the sump 34 and transports on its surface release agent from the sump to the delivery roll 30. By using a metering blade 31, a layer of polymeric release fluid can be applied initially to delivery roll 30 and subsequently to the elastomeric fusing surface in a control led thickness ranging from sub micron thickness to a thickness of the order of several microns of release fluid. Accordingly, by metering device 31 a layer of release fluid about 0.1 to 2 microns or greater thickness can be applied to the surface of elastomer fusing surface.

Figure 2:
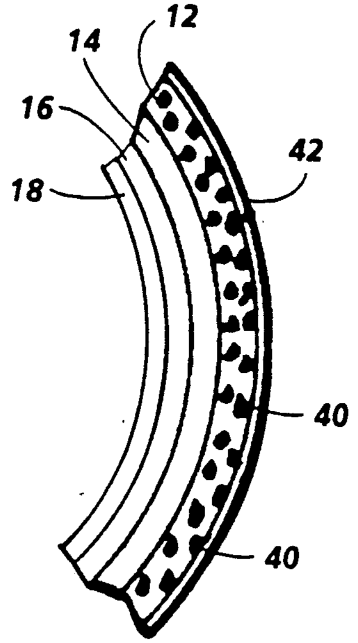
FIG. 2 is an enlarged fragmentary sectional view of one embodiment of the fuse member of the present invention.
Figure 3:
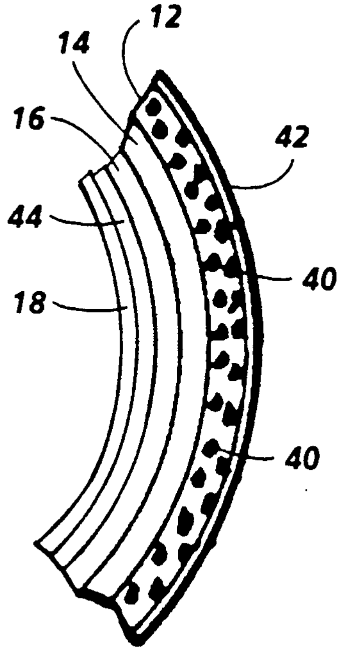
FIG. 3 is an enlarged fragmentary sectional view of an alternative embodiment of the fuser member of the present invention.

Referring now to FIGS. 2 and 3 there are shown two fragmentary views of alternative embodiments of the fuser member according to the present invention magnified many times in order to show the multi layered structure of the fuser member. In both FIGS. 2 and 3 the metal oxide filler particles 40 are shown as having irregular shapes, however, any form of metal oxide may be used in the elastomeric fusing surface 12, powders, platelets, sphroids, fibers, oval particles and the like. In addition, the film of polymeric release agent having functional groups is illustrated on the surface of elastomer fusing surface 12 and is designated by the reference numeral 42. FIG. 2 illustrates the embodiment represented in FIG. 1 wherein the adhesive layer is bound directly to a suitable base support member and FIG. 3 illustrates the alternative embodiment wherein the base support member 18 has an additional metal layer 44 coated thereon to provide bonding to the adhesive layer. The base support member may be selected from any suitable material. Typically, it may be selected from aluminum, anodized aluminum, steel, nickel, copper and the like. In a preferred embodiment it is an aluminum tube in the embodiment as illustrated in FIG. 2 or alternatively a flame sprayed aluminum coated steel tube in the embodiment as illustrated in FIG. 3.

According to the present invention, the adhesive layer bonds the base support member to a tie coat layer which in turn bonds the adhesive layer to the fusing or release layer. With the use of a tie coat layer between the adhesive and the release layer, longer fuser roll life without debonding at elevated temperatures may be achieved. All of the adhesive layer, tie coat layer and release are based on a copolymer of vinylidene fluoride and hexafluoropropylene to ensure compatibility and maximum bonding effectiveness between adjacent layers. In addition, the adhesive layer may be essentially the same formulation as the tie coat layer with the addition of a substantial quantity of a coupling agent comprising at least one organo functional silane and an activator. Typically, the organo functional silane and activator comprise at least 20 percent by weight of the solvent-free adhesive composition or adhesive layer.

In a specific embodiment the organo functional silane is a mixture of about four parts by weight of ethenyltriethoxy silane to one part by weight of 3-(triethoxysilyl)-1-propanamine such as that available from Minnesota Minning and Manufacturing Company under the designation Dynamar 5150.

We have found that for consistent bonding of the fusing surface to the base support member for a fuser roll operating at temperatures of the order of 240° C. for extended periods of time of the order of 5,000 to 7,000 hours the organo functional silane must be present in substantial quantities in the adhesive layer. If the organo functional silane plus activator is present in an amount less than about 20 percent by weight of the adhesive layer the fusing life when operating at temperatures of the order of 240° C. is much shorter.

The tie coat based on a copolymer of vinylidene fluoride and hexafluorpropylene has a substantial quantity of filler to provide thermal conductivity. A preferred copolymer of vinylidene fluoride and hexafluoropropylene is that available from E. I. DuPont DeNemours & Company under the designation Viton E45 which contains 77 mole percent vinylidene fluoride and 23 mole percent hexafluoropropylene. A typical tie coat formulation based on the Viton E45 is as follows:

Viton E45:100 parts by weight
Thermax 990 Black: 30 parts
MAGLITE Y: 9 Parts
Calcium Hydroxide: 3 parts
Calcium Oxide: 1.5 parts
DuPont Curative 20:2.1 parts
DuPont Curative 30:2.8 parts The Thermax 990 Black is a thermal carbon black available from R. T. Vanderbuilt to enhance thermal conductivity of the tie coat layer. The MAGLITE Y is a low activity magnesium oxide available from Merck and Company which is used as a curing activator. The calcium oxide is effective in rendering the tie coat relatively insensitive to relatively high relative humidity conditions. The calcium hydroxide is a curing activator which along with the magnesium oxide dehydrofluorinates the vinylidene fluoride to enable crosslinking. The Curative 20 and Curative 30 are curing agents both available from E. I. DuPont de Nemours; Curative 30 being about 50 percent by weight bisphenol AF and 50 percent by weight polyvinylidene fluoride-hexafluoropropylene and Viton Curative 20 being about one-third benzyl triphenyl phosphonium chloride and two-thirds poly(vinylidene fluoride hexafluoropropylene).

To make the adhesive layer the tie coat formulation above is mixed with a solvent such as methylisobutyl ketone to provide a solids content of from about 12 to about 20 percent by weight and the organo functional silane is added to the tie coat solution. In the solvent-free adhesive composition and the adhesive layer, the organo functional silane plus activatorcomprises from about 20 percent by weight to about 91 percent by weight while the tie coat comprises from about 80 to 90 percent by weight of the total composition. Any suitable organo functional silane or mixtures thereof may be employed in the coupling agent in the practice of the present invention. Typical silanes are represented by the formula.

$$[RO(O)_p\text{-}(RO)_m]_3Si\text{-}(R')_n\text{-}X,$$

where R can be an alkyl group having 1 to 4 carbon atoms, R' can be an alkyl group having 1 to 7 carbon atoms, p, m and n can be 0 or 1, and X can be any of chlorine, amino, vinyl, methyl, glycidoxy, epoxycyclohexyl, mercepto, benzyl, bis(2-hydroxlethyl)amino, ureido, carbonate, diethylene triamine, N-beta(aminoethyl)gamma-amino, or 3(N-styrylmethyl-2-aminoethyl-)amino.

Particularly effective materials include the triethoxy amino silanes and the triethoxy vinyl silanes and mixtures thereof. A particularly effective composition is a mixture of about 4 parts by weight of ethenyltriethoxy silane and 1 part by weight of 3-(triethoxysilyl)-1-propanamine.

The silane or mixtures thereof are the major constituent of the coupling agent with the activator being present in only a minor amount. Typically, the activator such as benzyl triphenyl phosphonium chloride is present in the coupling agent in an amount of from about 15 percent to 20 percent by weight.

The fusing surface or release layer is also based on the copolymer of vinylidene fluoride hexafluoropropylene such as Viton E45 and includes from about 5 to 30 parts by weight per 100 parts by weight of the copolymer of a metal oxide, salt or alloy to interact with a polymeric release agent having functional groups to provide an interfacial barrier layer between the fusing surface and the toner. The metal oxide, salt or alloy may be selected from those materials identified in the above identified Seanor patent but preferably is an oxide of copper, silver, gold, or lead and the like and most preferably is cupric oxide. The fusing surface or release layer may be made from the following composition:

Viton E45: 100 parts
CuO: 5 to 30 parts
Thermax 990 Black: 1 parts
MagLite D: 3 parts
Calcium Hydroxide: 6 parts
Curative 20: 1.4 parts
Curative 30: 2.8 parts The fuser member according to the present invention may be prepared in any suitable manner. Typically, the base support member is degreased, grit blasted and degreased once again. Further, as previously indicated if the base support member is steel, a layer of aluminum of a thickness of the order of about 2.25 millimeters may be applied by flame spraying. The tie coat is compounded as previously indicated and a solvent solution in a solvent such as dry methyl ethyl ketone of 20 percent solids is formulated. The adhesive coating is formulated by adding a coupling agent including an organo functional silane and an activator to the tie coat solution mixing and letting it dwell for about fifteen minutes. Thereafter, the adhesive coat is applied to the grit blasted core by dipping or preferably spraying to a thickness of from about 0.2 to 0.8 mils in two passes, each of which provides greater than 98 percent coverage. The adhesive coated grit blasted core is dried for about fifteen minutes after which the tie coat is applied to a thickness of from about 0.4 to 0.8 mils in two wet passes each having over 90 percent coverage of the substrate. The tie coat coated core is dried for fifteen minutes to two hours before drying at 170° F. for ten minutes to desolvate. The twice-coated support member is permitted to stand at ambient conditions for eight to twenty four hours following which the release layer may be applied by spraying, molding or preferably extruding over the adhesive system. Thereafter, the fuser member is cured in an autoclave for one hours and fifteen minutes at a temperature of about 160° F. followed by a twenty-four hour step post cure cycle of two hours at 94° C., two hours at 150° C., two hours at 177° C., two hours at 204° C. and sixteen hours at 232° C.

EXAMPLES

The following examples were part of a satistically designed experiment to investigate the material quantities and process effects on bonding performance. Unless otherwise specified all amounts and percentages are by weight. Examples I and IV are for comparison purposes only.

EXAMPLE I

A tie coat was compounded by adding 100 parts of Viton E45 to a two roll mill followed by the addition of 30 parts Thermax 990 Black, 3 parts magnesium oxide, 3 parts calcium hydroxide, 1.4 parts DuPont Curative 20 and 2.8 parts DuPont Curative 30 and mixing continued until the compound was thorougly mixed after which it was mixed with sufficient methyl ethyl ketone to form a mixture containing 12 percent by weight of the Viton compound.

The adhesive composition was prepared by adding 4.8 parts of DYNAMAR 5150 to 12 parts of the tie coat mixture. DYNAMAR 5150 is about a 6 percent mixture of the active ingredients ethyenyltriethoxy silane, 3-(triethoxysilyl)-1-propanamine and benzyl triphenyl phosphonium chloride curing activator in 94 percent methanol with a small amount of water, with each of the active ingredients being present in an amount less than about 5 percent. This formulation provides about 2.3 percent by weight of the organo functional silane plus activator in the solvent-free adhesive composition or adhesive layer.

Aluminum test pads about 1"×6" were prepared by grit blasting with 46 grit aluminum oxide followed by dipping into methyl ethyl ketone to degrease. One pad was wet with distilled water and allowed to dry and a second pad was heated to 350° F. Both pads were sprayed with the adhesive composition to a thickness of 0.4 mils followed by drying at room temperature for 10 to 20 minutes. A first layer of the tie coat was sprayed on the adhesive layer to a thickness 0.4 mils followed by drying at room temperature for 10 to 20 minutes and baking in an oven at 240° F. for 30 minutes. A second layer of the tie coat was sprayed to a thickness of 0.4 mils followed by drying at room temperature for 10 to 20 minutes before baking at 170° F. for 10 minutes.

The fusing surface or release layer was added to the top of the three previous layers by molding a layer 1.5 mm thick of the following composition:

Viton E45: 100 parts
Cupric oxide: 15 parts
MagLite D: 3 parts
Calcium Hydroxide: 6 parts
DuPont Curative 20: 1.4 parts
DuPont Curative 30: 2.8 parts
N990 Black: 1 part The test pads were cured in a mold autoclave for 30 minutes at a temperature of about 320° F. followed by a twenty four hour step post were cycle of two hours at 94° C., two hours at 150° C., two hours at 177° C., two hours at 204° C. and sixteen hours at 232° C.

The test pads were aged in a hot air oven at 240° C. and the adhesive system evaluated about every 7 days at room temperature by a static peel test wherein cuts are made through the three rubber layers to the aluminum substrate and the strips are then pulled by hand to determine the locus of failure. Both the wet and dry prepared substrates failed the static peel test at eight days when all three layers could be manually pulled off the substrate and the aluminum was clearly visible.

EXAMPLE II

The procedure of EXAMPLE I is repeated except that 26 parts of the DYNAMAR 5150 was added to 12 parts of the tie coat mixture to provide the adhesive composition. This formulation provides about 11.5 percent by weight of the organo functional silane plus activator in the solvent-free adhesive composition or adhesive layer. Both wet and dry test pads were prepared and subjected to the aging and the static peel test and both exhibited failure within the adhesive layer rather than between the aluminum substrate and the adhesive layer after 47 days of aging.

EXAMPLE III

The procedure of EXAMPLE I was repeated except that the tie coat contained 9 parts by weight magnesium oxide and 2 parts by weight calcium oxide. In addition, 49 parts of DYNAMAR 5150 was added to 12 parts of the tie coat mixture to provide the adhesive composition. This formulation provides about 20 by weight of the organo functional silane plus activator in the solvent free adhesive composition or adhesive layer. A test pad was prepared in the same way except that the aluminum substrate was not wet and allowed to dry or heated but just exposed to ambient conditions. The pad was subjected to aging and the static peel test and exhibited the same failure as in EXAMPLE II after 47 days of aging.

EXAMPLE IV

For comparision purpose a further example was prepared using a typical expoxy adhesive Thixon 300/301. Thixon is a trademark of Dayton Chemical Products Laboratories. The procedure of EXAMPLE I was repeated except that the mix of Thixon 300/301 in a weight ratio of 25 to 22.5 was diluted with an equal amount of dry methyl ethyl ketone which was sprayed onto an aluminum substrate which had only been exposed to ambient conditions to a thickness of 0.5 mil after which it was dried at room temperature for 10 to 20 minutes followed by baking at 320° F. for 10 minutes. The tie coat was compounded by mixing 100 parts of Viton E45, 30 parts of Thermax 990 black, 15 parts of magnesium oxide, 5 parts of ferric oxide, 2.1 parts of DuPont Curative 20 and 2.8 parts of DuPont Curative 30. A test pad was prepared in the same way and subject to aging and the static peel test and exhibited the same failure as in EXAMPLE I after seven days.

EXAMPLE V

Fuser rolls were prepared using a cylindrical steel core having a flame sprayed aluminum layer about 0.25 mm on its surface. The tie coat had the following constituents:

Viton E45: 100 parts
N990 Black: 30 parts
Magnesium Oxide: 9 parts
Calcium Hydroxide: 3 parts
Calcium Oxide: 1.5 parts
Dupont Curative 20: 2.1 parts
Dupont Curative 30: 2.8 parts which were diluted in methyl ethyl ketone to provide a 20 percent by weight solids solution:

The adhesive composition was prepared by adding 36.5 parts by weight of DYNAMAR 5150 to 100 parts by weight of the 20 percent solids tie coat solution. The adhesive layer was applied to the aluminum substrate by spraying to a thickness of about 0.8 mils and allowed to dry for about one half hour after which the tie coat layer was sprayed over the adhesive layer to a thickness of about 0.8 mils. The fusing or release layer having the composition set further in EXAMPLE I was extruded over the adhesive and tie coat layer and the roll was placed in an autoclave for about 75 minutes at about 300° F. after which it was subjected to the post cure as recited in EXAMPLE I. Following curing the roll was ground to provide a uniform release surface layer about 10 mils thick.

Eighty such rolls were tested in Xerox 5046 copiers for an average machine volume of 114,000 copies with no debonding failures.

A comparison of Examples II and III according to the invention with Example I clearly indicates that too little organo functional silane and activator contributes to debonding between the substrate and the adhesive layers. Thus, according to the present invention, a fuser member of improved life capable of use at substantially elevated temperatures of the order of 240° C. has been provided. By providing a multiple layer fuser member wherein each of the layers is based on the same copolymer of vinylidene fluoride and hexafluoropropylene suitable compatibility between adjacent layers performing there individual functions of (1) bonding an adhesive layer to the substrate (2) bonding the adhesive layer to the tie coat, and (3) bonding the tie coat to the fusing surface or release layer have been provided. As a result of the compatibility between the adjacent layers a green tack is automatically formed between adjacent layers upon the application of the second layer before the fuser member is cured resulting in improved adhesion between adjacent layers.

All the patents referred to herein are hereby specifically, and totally incorporated by reference in their entirety in the instant specification.

While the invention has been described in detail with reference to specific and preferred embodiments, it will be appreciated that various modifications and variations will be apparent to the artisan. For example, while the invention has been illustrated with reference to a fuser roll, it will be understood that it has equal application to other fuser members such as flat or curved plate members in pressure contact with the roll. All such modifications and embodiments as may readily occur to one skilled in the art are intended to be within the scope of the appended claims.

We claim:

1. A multilayered fuser member for fusing thermoplastic resin toner images to a substrate in a fuser system of the type wherein a polymeric release agent having functional groups is applied to the surface of the fuser member, the multilayered fuser member comprising in sequential order a base support member, an adhesive layer comprising a copolymer of vinylidene fluoride and hexafluoropropylene and at least 20% by weight of the adhesive layer of a coupling agent comprising at least one organo functional silane represented by the formula:

$$[RO(O)_p\text{-}(RO)_m]_3Si\text{-}(R')_n\text{-}X,$$

where R can be an alkyl group having 1 to 4 carbon atoms, R' can be an alkyl group having 1 to 7 carbon atoms, where p, m and n can be 0 or 1, and X is selected from the group consisting of chlorine, amino, vinyl, methyl, glycidoxy, epoxycyclohexyl, mercepto, benzyl, bis(2-hydroxlethyl)amino, ureido, carbonate, diethylene triamine, N-beta(aminoethyl)gamma-amino, and 3(N-styrylmethyl-2-aminoethyl)amino; an activator; a tie coat layer comprising a copolymer of vinylidene fluoride and hexafluoropropylene and an outer elastomeric fusing surface comprising a copolymer of vinylidene fluoride and hexafluoropropylene and containing a metal oxide present in an amount sufficient to interact with a polymeric release agent having functional groups to provide an interfacial barrier layer between said fusing surface and toner.

2. The fuser member of claim 1 wherein said base support member has an aluminum surface.

3. The fuser member of claim 2 wherein said aluminum surface is a flame sprayed layer on a cylindrical steel roll support member.

4. The fuser member of claim 1 wherein said at least one organo functional silane is a mixture of triethoxy amino silane and triethoxy vinyl silane.

5. The fuser member of claim 4 wherein the organosilane is a mixture of about 4 parts by weight of ethenlytriethoxy silane to 1 part by weight of 3-(triethoxysilyl)-1-propanamine which is present in said adhesive layer in an amount less than 91% by weight.

6. The fuser member of claim 1 wherein said activator is benzyl triphenyl phosphonium chloride.

7. The fuser member of claim 1 wherein said copolymer in each of the adhesive, tie-coat layers and fusing surface is about 77 mole percent vinylidene fluoride and about 23 mole percent hexafluoropropylene.

8. The fuser member of claim 1 wherein said metal oxide is cupric oxide present in an amount of from about 5 to 30 percent by weight of the fusing surface.

9. The fuser member layer of claim 1 wherein said adhesive layer is from about 0.2 to about 0.8 mils thick and said tie coat is from about 0.4 to about 0.8 mils thick and said fusing surface is from about 4.0 mils to about 11.0 mils thick.

* * * * *